United States Patent
Baratz et al.

(10) Patent No.: US 9,614,905 B2
(45) Date of Patent: Apr. 4, 2017

(54) DETERMINATION OF PERSONA INFORMATION AVAILABILITY AND DELIVERY ON PEER-TO-PEER NETWORKS

(75) Inventors: Alan Edward Baratz, Los Altos Hills, CA (US); Anthony Frank Bartolo, Saratoga, CA (US); Jayesh Govindarajan, Sunnyvale, CA (US); Anwar A. Siddiqui, Emeryville, CA (US); John F. Buford, Princeton, NJ (US); Vyankatesh Balaji Deshpande, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 1519 days.

(21) Appl. No.: 12/836,868

(22) Filed: Jul. 15, 2010

(65) Prior Publication Data

US 2011/0090901 A1 Apr. 21, 2011

Related U.S. Application Data

(60) Provisional application No. 61/253,303, filed on Oct. 20, 2009.

(51) Int. Cl.
*H04L 12/66* (2006.01)
*H04L 29/08* (2006.01)
(Continued)

(52) U.S. Cl.
CPC ...... *H04L 67/104* (2013.01); *H04L 29/12094* (2013.01); *H04L 61/1529* (2013.01);
(Continued)

(58) Field of Classification Search
CPC .................................................. H04L 67/104
(Continued)

(56) References Cited

U.S. PATENT DOCUMENTS 6,175,859 B1 1/2001 Mohler
6,798,872 B1 9/2004 Matsumoto et al.
(Continued)

FOREIGN PATENT DOCUMENTS

CN 101044735 A 9/2007
CN 101494831 A 7/2009
(Continued)

OTHER PUBLICATIONS

U.S. Appl. No. 61/160,572, filed Mar. 16, 2009.
(Continued)

*Primary Examiner* — Parth Patel

(57) ABSTRACT

A method of operating a communication system to establish communication sessions between an origination network and a peer-to-peer network comprises receiving session signaling to establish a session between an origination device in the origination network and a destination node in the peer-to-peer network, wherein the session signaling includes a participant identifier associated with the origination device. The method further comprises processing the participant identifier to determine if persona information that identifies an originating participant and an entity associated with the originating participant is available for display by a destination device registered as the destination node on the peer-to-peer network and, if the persona information is available, transferring the persona information for delivery to and display by the destination device to a destination participant. The method further comprises establishing the session over the origination network and the peer-to-peer network and exchanging user communications for the session between the origination device and the destination device.

19 Claims, 7 Drawing Sheets

(51) Int. Cl.
*H04L 29/12* (2006.01)
*H04M 3/42* (2006.01)
*H04L 29/06* (2006.01)
*H04M 7/00* (2006.01)

(52) U.S. Cl.
CPC ........ *H04L 65/104* (2013.01); *H04L 65/1069* (2013.01); *H04L 65/1096* (2013.01); *H04M 3/42042* (2013.01); *H04L 29/12122* (2013.01); *H04L 61/1547* (2013.01); *H04L 67/306* (2013.01); *H04M 7/0063* (2013.01)

(58) Field of Classification Search
USPC .......... 455/415; 370/395.2, 352, 351; 707/5; 715/759; 709/228, 203; 726/12
See application file for complete search history.

(56) References Cited

U.S. PATENT DOCUMENTS

| | | | |
|---|---|---|---|
| 8,725,895 | B2 | 5/2014 | Chaturvedi et al. |
| 2002/0058504 | A1* | 5/2002 | Stanforth ...................... 455/426 |
| 2003/0086553 | A1 | 5/2003 | Dezonno et al. |
| 2003/0105812 | A1* | 6/2003 | Flowers et al. ............... 709/203 |
| 2004/0260761 | A1 | 12/2004 | Leaute et al. |
| 2005/0135335 | A1 | 6/2005 | Hession et al. |
| 2006/0052091 | A1* | 3/2006 | Onyon et al. ................... 455/415 |
| 2006/0064461 | A1 | 3/2006 | Ludwig et al. |
| 2006/0120377 | A1* | 6/2006 | Caballero-McCann et al. .......................... 370/395.2 |
| 2006/0259765 | A1 | 11/2006 | Song et al. |
| 2006/0265508 | A1 | 11/2006 | Angel et al. |
| 2007/0047519 | A1* | 3/2007 | Bangor et al. ................. 370/352 |
| 2007/0047700 | A1 | 3/2007 | Mohler |
| 2007/0078930 | A1 | 4/2007 | Ludwig et al. |
| 2007/0110031 | A1 | 5/2007 | Szeto |
| 2007/0168426 | A1 | 7/2007 | Ludwig et al. |
| 2008/0008305 | A1 | 1/2008 | Neuhaus |
| 2008/0027924 | A1* | 1/2008 | Hamilton et al. ................ 707/5 |
| 2008/0075063 | A1* | 3/2008 | Ha .................................. 370/351 |
| 2008/0123839 | A1 | 5/2008 | McCormack et al. |
| 2008/0163075 | A1* | 7/2008 | Beck et al. ..................... 715/759 |
| 2008/0189366 | A1 | 8/2008 | Cox et al. |
| 2009/0136016 | A1 | 5/2009 | Gornoi et al. |
| 2010/0011111 | A1* | 1/2010 | Vizaei ........................... 709/228 |
| 2010/0071053 | A1* | 3/2010 | Ansari et al. ..................... 726/12 |
| 2010/0162173 | A1 | 6/2010 | Schmitlin et al. |
| 2010/0260326 | A1 | 10/2010 | Michaelis et al. |
| 2011/0075824 | A1 | 3/2011 | Geppert et al. |

FOREIGN PATENT DOCUMENTS

| | | |
|---|---|---|
| DE | 102006039170 | 2/2008 |
| WO | 2008004207 | 1/2008 |
| WO | 2011126507 A1 | 10/2011 |

OTHER PUBLICATIONS

U.S. Appl. No. 61/163,559, filed Mar. 26, 2009.
D. Bryan, et al.; "Concepts and Terminology for Peer to Peer SIP;" PSPSIP Working Group, Internet-Draft; Jul. 7, 2008; pp. 1-30; draft-ietf-p2psip-concepts-02.
E. Marocco, et al.; "Interworking between P2PSIP Overlays and Conventional Sip Networks;" Network Working Group, Internet-Draft; Mar. 2, 2007; pp. 1-25; draft-marocco-p2psip-interwork-01.
E. Shim, et al.; "An Architecture for Peer-to-Peer Session Initiation Protocol (P2P SIP);" SIPPING WG, Internet Draft; Feb. 26, 2006; pp. 1-29; draft-shim-sipping-p2p-arch-00.
Timo Toivanen, et al.; "A Study on Interworking between Centralized SIP, P2P-SIP, and PSTN Networks;" May 5, 2006; 7 pages; Helsinki University of Technology; Finland.
C. Irish; "Web-enabled Call Centre;" BT Technology Journal; Apr. 2000; pp. 65-71; vol. 18; No. 2.
U.S. Appl. No. 60/871,423, filed Dec. 21, 2006.
U.S. Appl. No. 60/870,359, filed Dec. 15, 2006.
Marocco et al. "Interworking between P2PSIP Overlays and Conventional SIP Networks." SIPeerior Technologies, Inc. Mar. 2, 2007.

* cited by examiner

DETERMINATION OF PERSONA INFORMATION AVAILABILITY AND DELIVERY ON PEER-TO-PEER NETWORKS

RELATED APPLICATIONS

This application is related to and claims priority to U.S. Provisional Patent Application No. 61/253,303, entitled "VoP2P and Hybrid VoIP/VoP2P for Business Persona," filed on Oct. 20, 2009, which is hereby incorporated by reference in its entirety.

TECHNICAL BACKGROUND

In the rapidly changing field of telecommunications, non-traditional phone products are increasing in popularity. Voice over Internet Protocol (VoIP) phone calling is one example that both enterprise class and residential class consumers enjoy in ever larger numbers due to its affordability and features. In addition to voice calling, VoIP products frequently provide chat and video calling capabilities.

While many VoIP products rely on centrally managed network architectures to function, VoIP can be delivered using peer-to-peer (P2P) technologies. A peer-to-peer network, aside from a limited number of root nodes, typically lacks the centralized elements and control of traditional, non-P2P networks. P2P networks can be considered overlay networks that operate at least a layer above an underlying communication network or collection of networks. Skype and Peerio are just two examples of P2P VoIP products among many presently available that provide voice, chat, and video services using peer-to-peer technology.

Initially, the low quality of service of P2P VoIP products dissuaded customers from adopting these services. But over time, the quality of P2P VoIP products has increased sufficiently that they now enjoy widespread acceptance and use by residential and other non-enterprise class consumers. Unfortunately, present P2P VoIP products still have not attracted widespread acceptance by enterprise class consumers to a great extent because they lack many of the features required for enterprise class service.

Overview

Embodiments disclosed herein include systems, methods, and software for providing an enhanced P2P VoIP experience whereby persona information for an originating session participant who is not on a P2P VoIP network is delivered for display to another session participant who is connected to the P2P network. The persona information identifies the originating session participant and an entity with which that session participant is associated.

In an embodiment, a method of operating a communication system to establish communication sessions between an origination network and a peer-to-peer network comprises receiving session signaling to establish a session between an origination device in the origination network and a destination node in the peer-to-peer network, wherein the session signaling includes a participant identifier associated with the origination device. The method further comprises processing the participant identifier to determine if persona information that identifies an originating participant and an entity associated with the originating participant is available for display by a destination device registered as the destination node on the peer-to-peer network and, if the persona information is available, transferring the persona information for delivery to and display by the destination device to a destination participant. The method further comprises establishing the session between the origination device and the destination device over the origination network and the peer-to-peer network, and exchanging user communications for the session between the origination device and the destination device.

In another embodiment, a communication system to establish communication sessions between an origination network and a peer-to-peer network comprises a gateway system. The gateway system is configured to receive session signaling to establish a session between an origination device in the origination network and a destination node in the peer-to-peer network, wherein the session signaling includes a participant identifier associated with the origination device, process the participant identifier to determine if persona information that identifies an originating participant and an entity associated with the originating participant is available for display by a destination device registered as the destination node on the peer-to-peer network and, if the persona information is available, transfer the persona information for delivery to and display by the destination device to a destination participant, wherein the session is established between the origination device and the destination device over the origination network and the peer-to-peer network, and wherein user communications for the session are exchanged between the origination device and the destination device.

In yet another embodiment, program instructions stored on a computer readable medium, when executed by a communication system, direct the communication system to receive session signaling to establish a session between an origination device in the origination network and a destination node in the peer-to-peer network, wherein the session signaling includes a participant identifier associated with the origination device, process the participant identifier to determine if persona information that identifies an originating participant and an entity associated with the originating participant is available for display by a destination device registered as the destination node on the peer-to-peer network and, if the persona information is available, transfer the persona information for delivery to and display by the destination device to a destination participant, establish the session between the origination device and the destination device over the origination network and the peer-to-peer network, and exchange user communications for the session between the origination device and the destination device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
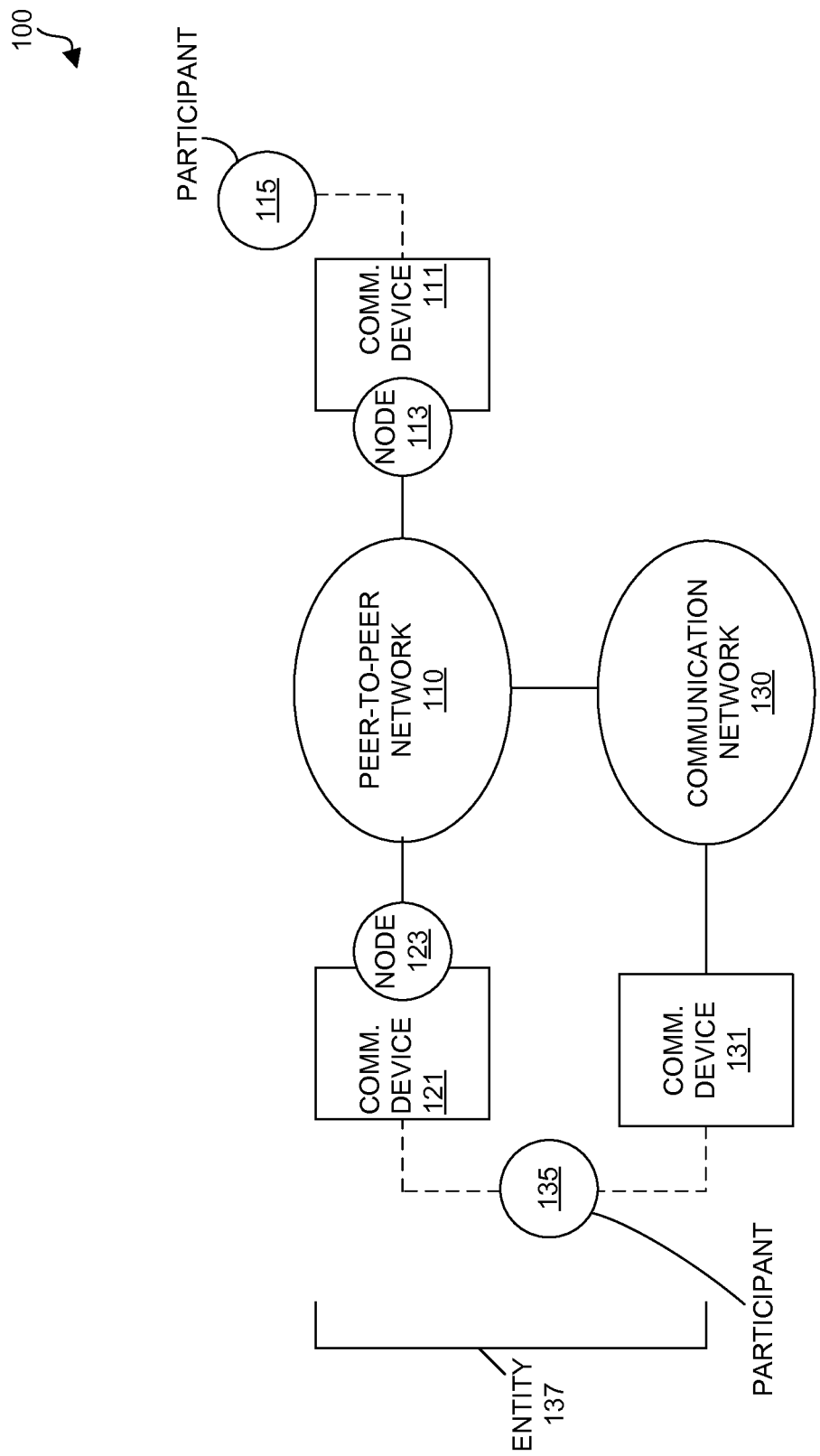
FIG. 1 illustrates a communication system in an exemplary embodiment.

FIG. 1 illustrates communication system 100 in an exemplary embodiment. Communication system 100 includes peer-to-peer (P2P) network 110, communication network 130, communication devices 111, 121, and 131, and node 113 and 123. Communication device 111 is operated by participant 115, and communication devices 121 and 131 are operated by participant 135. Participant 135 is associated with entity 137.

P2P network 110 comprises a network of nodes linked to network participants that together form a distributed network architecture. P2P network 110 can be considered an overlay network that operates at least a layer above an underlying communication network or collection of networks. For instance, P2P network 110 can overlay an internet network.

Referring to FIG. 1, communication devices 111 and 121, once registered as nodes with P2P network 110, include nodes 113 and 123, respectively. Nodes 113 and 123 may be software elements running on respective communication devices 111 and 121 that allows respective participants 115 and 135 to participate in communication sessions over P2P network 110. For example, nodes 113 and 123 may be communication software that provides chat, voice calling, or video calling capability, including variations or combinations thereof.

Communication network 130 comprises any network that facilitates communication between communication device 131 and nodes on P2P network 110, such as nodes 113 and 123. Communication network 130 could comprise wireless communication nodes, network switches, Internet routers, network gateways, computer systems, communication links, or some other type of communication equipment—including combinations thereof. Communication network 130 may be configured to communicate over metallic, wireless, or optical links. Communication network 130 may be configured to use time division multiplexing, telephony, internet protocol, Ethernet, optical networking, communication signaling, wireless protocols, or some other communication format—including combinations thereof.

Communication device 111 may comprise any type of device operable by participant 115 in order to participate in communication sessions over P2P network 110. Likewise, communication devices 121 and 131 may comprise any type of device operable by participant 135 in order to participate in communication sessions over P2P network 110. Examples of such communication devices include computers, phones, or video phones, as well as any combination or variation thereof.

As illustrated, participant 135 is associated with entity 137. An entity could be a group, association, or other such enterprise with which participant 135 may be linked, such as a business, an academic institution, a government entity, or the like. For instance, entity 137 may be a company owned or operated by participant 135. In other examples, entity 137 may be a company that employs participant 135. It should be understood that a variety of other types of associative relationships between participants and entities are contemplated. It should also be understood that entity 137 could be a distinct entity or could be a branch or department of a larger entity.

Figure 2:
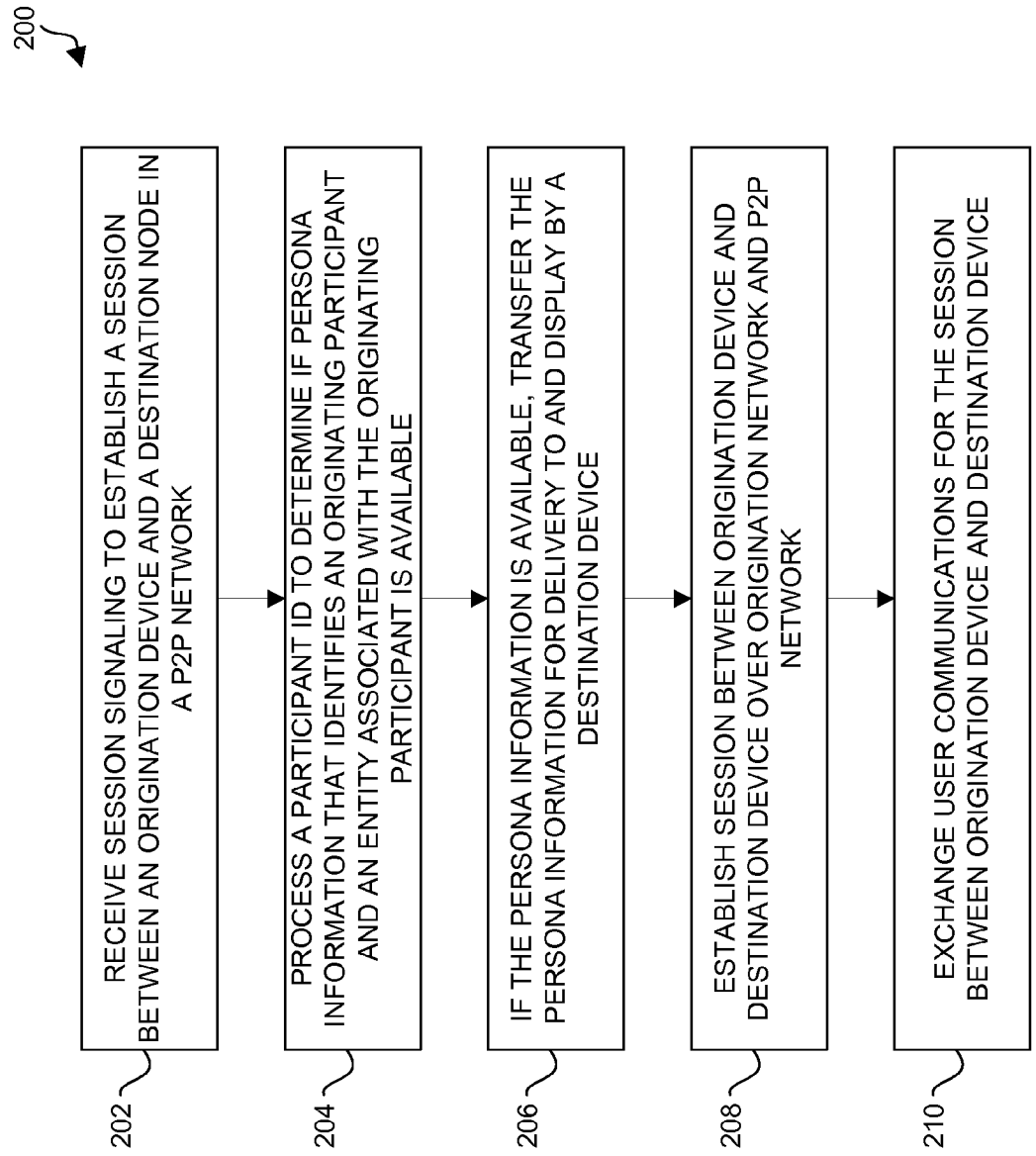
FIG. 2 illustrates a method of operating a communication system in an exemplary embodiment.

FIG. 2 illustrates a method 200 of operating communication system 100. The steps of the method are indicated below parenthetically. To begin, an originating communication device initiates a communication session with a destination communication device. As a result of the originating communication device initiating the communication session, session signaling is received to establish a session between an origination device and a destination node in a P2P network (202). For the purpose of illustration, it can be assumed that communication device 131, operated by participant 135, is the origination device and node 113 in P2P network 110 is the destination node.

The session signaling may include a participant identifier associated with the origination device 131. The participant identifier could comprise any information that may be used to identify participant 135 and/or origination device 131. For example, the participant identifier could comprise a telephone number, caller identification (caller ID) information, Automatic Number Identification (ANI), Session Initiation Protocol (SIP) user ID, Mobile Directory Number (MDN), Mobile Station Identifier (MSID), Electronic Serial Number (ESN), Mobile Equipment Identifier (MEID), International Mobile Equipment Identity (IMEI), International Mobile Subscriber Identity (IMSI), Media Access Control (MAC) address, packet address, or some other information that identifies origination device 131 and/or participant 135.

The participant identifier is processed to determine if persona information that identifies an originating participant 135 and an entity 137 associated with the originating participant 135 is available (204). In some examples, this may involve determining whether persona information is associated with the participant identifier in a relational database. In this example, the participant identifier must be processed to determine if persona information is available for participant 135 because communication device 131 is not on P2P network 410. In contrast, if participant 135 had used communication device 121 to initiate a communication session with participant 115 at node 113, the participant identifier would not require processing to determine persona information for participant 135 since devices 111 and 121 are registered as respective nodes 113 and 123 on the same P2P network 110.

Referring again to the method of FIG. 2, if the persona information is available, the persona information is transferred for delivery to and display by a destination device 111 (206). The persona information may be transferred for delivery to destination device 111 either prior to or during a communication session between originating device 131 and node 113. It should be understood that the persona information could be transferred in discrete transfers or could be streamed continuously. Other delivery mechanisms are possible. In this illustration, persona information identifying participant 135 and entity 137 is transferred for delivery to destination communication device 111 for display to participant 115.

Ultimately, a communication session is established between origination device 131 and destination device 111 over origination communication network 130 and P2P network 110 (208). This session may be accomplished by establishing a P2P link between node 113 and P2P network 110, and a non-P2P link between communication device 131 and communication network 130. The non-P2P link could comprise, for example, a SIP link.

Once the session is established, participants 115 and 135 can exchange user communications with each other using respective communication devices 111 and 131. Examples of user communications include voice calls, text-based chat, or video communications (210). It should be understood that the exchange of user communications could occur prior to, during, or after the transfer and display of persona information.

Figure 3:
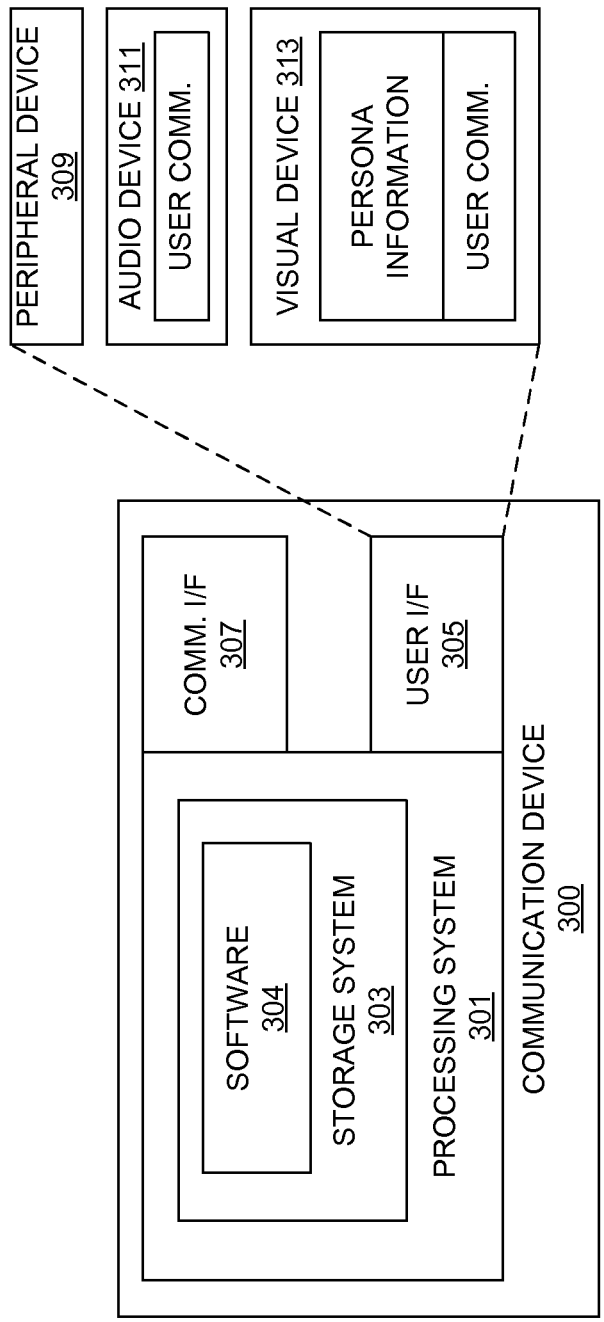
FIG. 3 illustrates a communication device in an exemplary embodiment.

FIG. 3 illustrates communication device 300 in an exemplary embodiment. Communication device 300 may be representative of communication devices 111 and 131, although devices 111 and 131 could use alternative configurations. For example, communication device 131 may not include a user interface 305. Communication device 300 includes processing system 301, storage system 303, software 304, user interface 305, and communication interface 307. Processing system 301 is linked to storage system 303, user interface 305, and communication interface 307. Storage system 303 stores software 304, executable in operation by processing system 301.

Communication interface 307 comprises a network card, network interface, port, or interface circuitry that allows communication device 300 to communicate with other communication devices over a variety of networks. Communication interface 307 may also include a memory device, software, processing circuitry, or some other device. Communication interface 307 may use various communication protocols, such as time division multiplex, internet, Ethernet, wireless, or some other communication format—including combinations thereof—to exchange communications as described herein for communication devices, such as user communications and persona information.

User interface 305 comprises components that interact with a user to receive user inputs and user communications and to present media and/or information. User interface 305 may include a speaker, microphone, buttons, lights, display screen, mouse, keyboard, or some other user input/output apparatus—including combinations thereof.

In this embodiment, user interface 305 includes peripheral device 309, audio device 311, and visual device 313. Peripheral device 309 could be any device that can receive or output user communications, such as a keyboard, mouse, or other such device. Likewise, audio device 311 is any device capable of receiving or outputting user communications, such as voice communications. Examples of audio device 311 include speakers, headphones, earphones, and microphones. Visual device 313 is any device capable of displaying images to a user, including persona information and user communications. An example of a visual device 313 is a display screen.

Processing system 301 may comprise a microprocessor and other circuitry that retrieves and executes software 304 from storage system 303. Storage system 303 comprises a disk drive, flash drive, data storage circuitry, or some other memory apparatus. Processing system 301 is typically mounted on a circuit board that may also hold storage system 303 and portions of communication interface 307 and user interface 305.

Software 304 comprises computer programs, firmware, or some other form of machine-readable processing instructions. Software 304 may include an operating system, utilities, drivers, network interfaces, applications, virtual machines, or some other type of software. When executed by processing system 301, software 304 directs processing system 301 to operate communication device 300 to perform as described herein for communication devices, including an origination device, a destination device, and communication devices 111 and 131.

Figure 4:
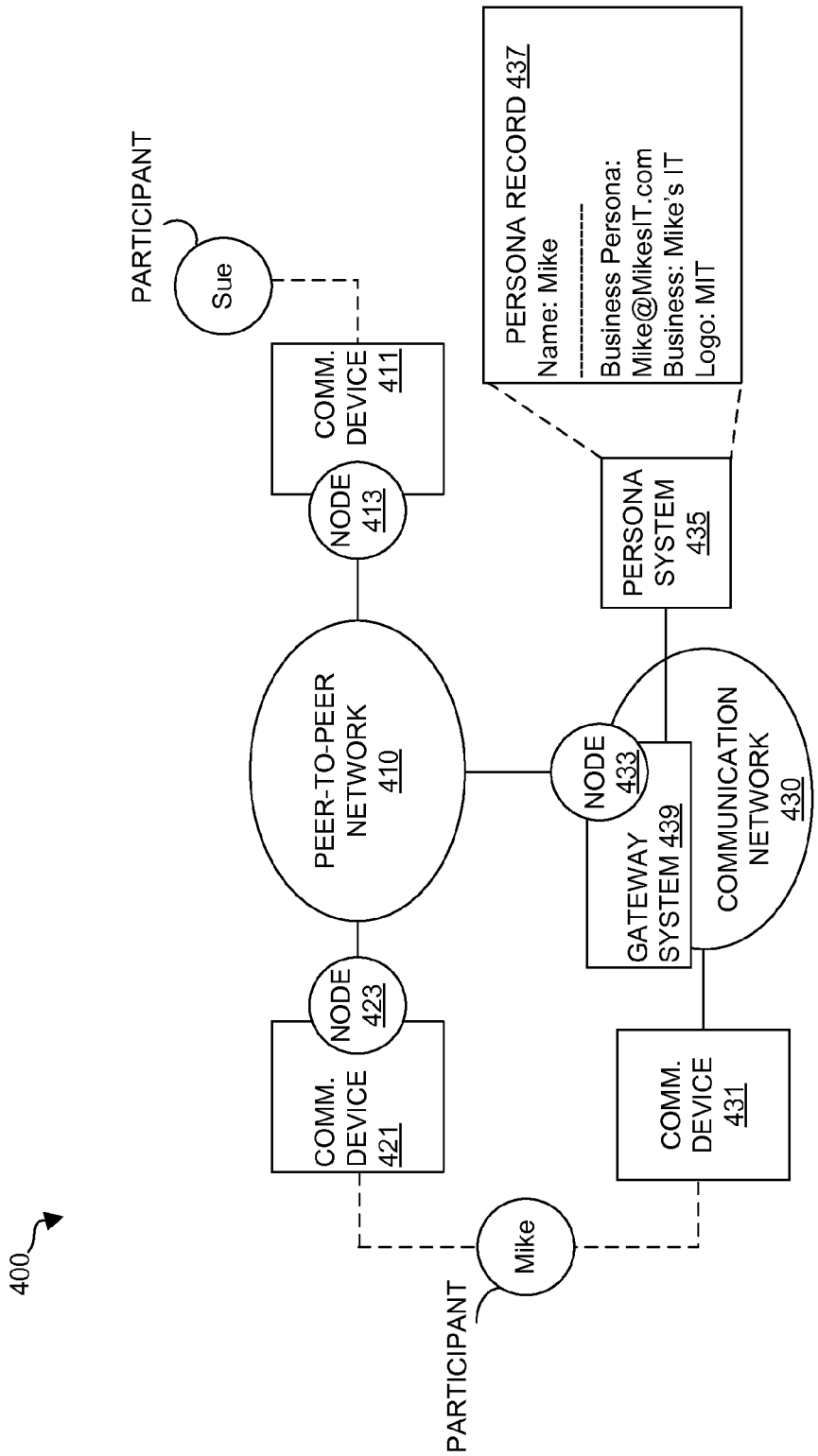
FIG. 4 illustrates a communication system in an exemplary embodiment.

FIG. 4 illustrates communication system 400 in an exemplary embodiment. Communication system 400 includes peer-to-peer (P2P) network 410, communication network 430, communication devices 411, 421, and 431, nodes 413, 423, and 433, persona system 435, and gateway system 439.

In this illustrative embodiment, communication device 411 is operated by participant Sue, while communication devices 421 and 431 are operated by participant Mike. Participant Mike is associated with an entity, as can be seen from persona record 437, which contains information describing participant Mike. Persona record 437 is stored within persona system 435.

Persona record 437 contains information about the entity associated with participant Mike. Thus, it should be understood that the entity may have control over many or all aspects of the persona information. In this manner, the recipient of the persona information will have confidence in the association of participant Mike with the entity. This may be accomplished by signing the persona information with the entity's digital certificate. It should be understood that other techniques are possible and are contemplated herein.

P2P network 410 comprises a network of nodes linked to network participants that together form a distributed network architecture. P2P network 410 can be considered an overlay network that operates at least a layer above an underlying communication network or collection of networks. For instance, P2P network 410 can overlay an internet network.

Referring to FIG. 4, communication devices 411 and 421, and gateway system 439, once registered as nodes with P2P network 410, include nodes 413, 423, and 433, respectively. In some examples, P2P network 410 may also include a registration system (not shown) which may include a node previously registered with P2P network 410 and would allow communication devices 411 and 421 and gateway system 439 to initially register with P2P network 410. In some examples, nodes 413, 423, and 433 could comprise communication software that provides chat, voice calling, or video calling capability, including variations or combinations thereof. A Skype program application or a Peerio program application are examples of communication software that could be employed on a communication device to provide P2P chat, voice, or video services.

Communication network 430 comprises any network that facilitates communication between communication device 431 and nodes on P2P network 410. Communication network 430 could comprise wireless communication nodes, network switches, Internet routers, network gateways, computer systems, communication links, or some other type of communication equipment—including combinations thereof. Communication network 430 may be configured to communicate over metallic, wireless, or optical links. Communication network 430 may be configured to use time division multiplexing, telephony, internet protocol, Ethernet, optical networking, communication signaling, wireless protocols, or some other communication format—including combinations thereof.

Communication device 411 may comprise any type of device operable by participant Sue in order to participate in communication sessions over P2P network 410. Likewise, communication devices 421 and 431 may comprise any type of device operable by participant Mike in order to participate in communication sessions over P2P network 410. Examples of such communication devices include computers, phones, or video phones, as well as any combination or variation thereof. Communication device 300, illustrated in FIG. 3, provides an example of communication devices 411, 421, and 431.

Gateway system 439 comprises any device capable of interfacing between communication network 430 and P2P network 410 and registering as node 433 with P2P network 410. Typically, gateway system 439 comprises a computer system and communication interface. Gateway system 439 may also include other components such a router, server, data storage system, and power supply. Gateway system 439 may reside in a single device or may be distributed across multiple devices. Gateway system 439 may be a discrete system or may be integrated within other systems—including other systems within communication network 430. Gateway system 439 could comprise a network gateway, private branch exchange, mobile switching center, server, internet router, packet gateway, network switch, Internet access node, application server, service node, firewall, or some other communication system—including combinations thereof.

Persona system 435 comprises a storage system to store persona records, such as persona record 437, and a communication interface to communicate with gateway system 439. Although persona system 435 is shown in FIG. 4 as separate from gateway system 439, in some examples, persona system 435 could be integrated within the components of gateway system 439. Further, in some examples, persona system 435 could be in communication with P2P network 410 in order to provide persona information for communication devices 411 and 421. In this case, persona system 435 may also register as a node on the P2P network 410.

As illustrated by persona record 437, participant Mike has a business persona related to his company, Mike's IT. It can be assumed for illustrative purposes that Mike's IT is a business related to information technology. Mike's business persona includes characteristics that distinguish him when communicating over P2P network 410, such as a communication handle "mike@mikesIT.com." Other aspects of his business persona include the name of his business, Mike's IT, as well as a logo for his business, MIT. Mike's business persona could also include additional information associated with his business, such as a business telephone number, license number, calendar, alternate contact information, or other related information (not shown).

Figure 5:
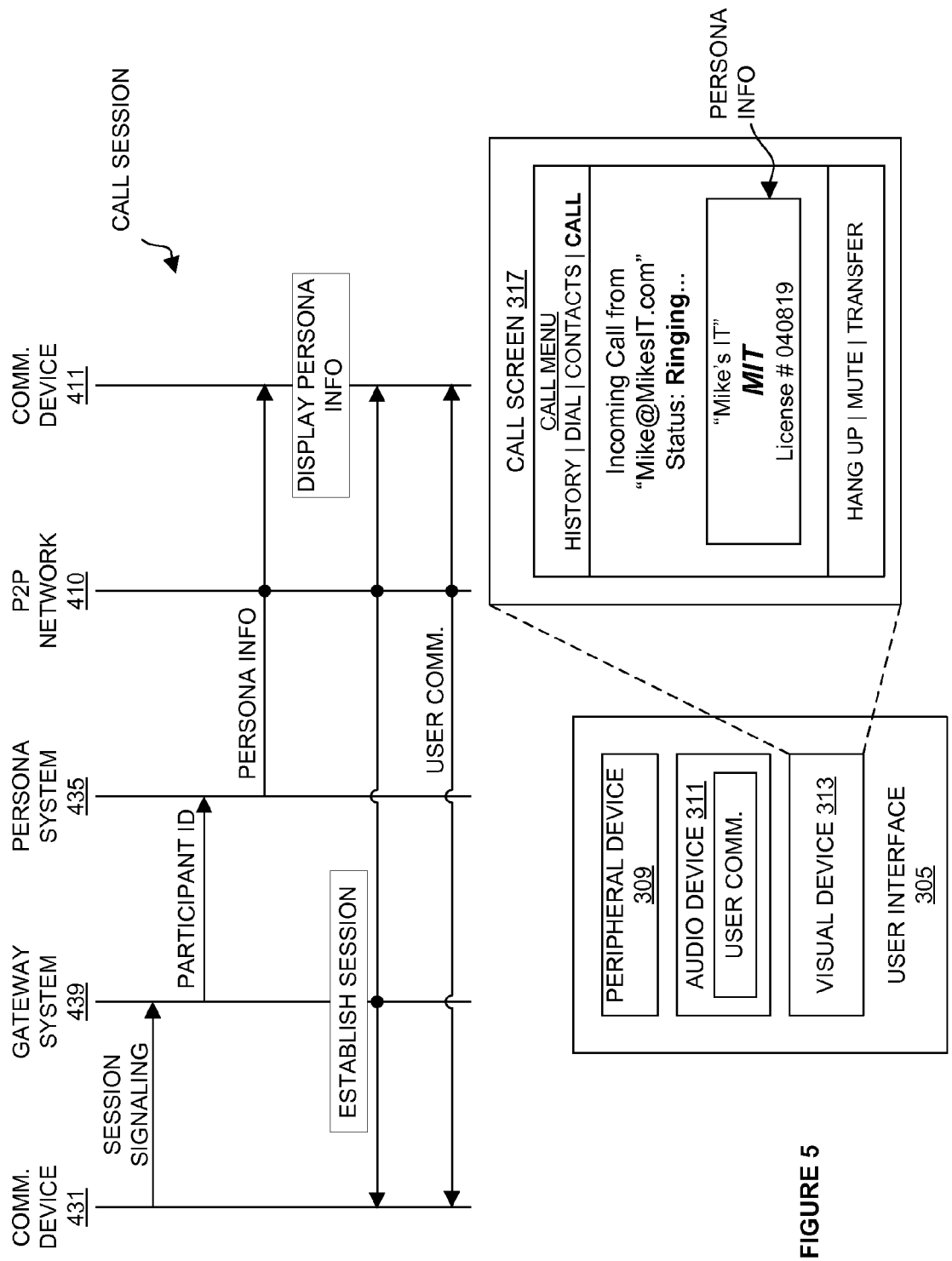
FIG. 5 illustrates a call flow diagram and a block diagram of a user interface and a call screen in an exemplary embodiment.

FIG. 5 illustrates an exemplary embodiment whereby Sue, a customer or potential customer of Mike, engages in a communication session with Mike. In this example, the communication session is a voice call initiated by Mike using communication device 431. In FIG. 5, two diagrams are shown: a session flow diagram and a block diagram. The session flow diagram illustrates the information flow of the session. The block diagram demonstrates a user experience.

Referring to the session flow diagram of FIG. 5, Mike operates communication device 431 to initiate a call to communication device 411 operated by Sue. Note that communication device 431 is not a node on P2P network 410. Instead, communication device 431 is in communication with P2P network 410 via communication network 430, which could comprise a public switched telephone network (PSTN), voice over internet protocol (VoIP) network, wireless communication network, a different type of P2P communication network from P2P network 410, or some other type of communication network.

Typically, Mike places the call to Sue using communication device 431 by dialing a PSTN telephone number for Sue that is associated with Sue's P2P connection at node 413. In some examples, Sue's P2P connection at node 413 comprises a twinned PSTN number for Sue. Thus, Mike may place the call to Sue using communication device 431 by dialing the twinned PSTN number to reach Sue at node 413 on P2P network 410. The call triggers a transfer of session signaling over communication network 430 received by gateway system 439. In this example, the session signaling to initiate the call is not the same signaling used on P2P network 410. For example, the session signaling used to initiate the call could comprise non-P2P signaling, such as SS7 signaling, SIP call signaling, wireless communication signaling, or some other type of non-P2P call signaling, or could comprise P2P signaling in a different protocol than used on P2P network 410. This session signaling includes a participant identifier that is associated with communication device 431.

Gateway system 439 processes the participant identifier to determine if persona information is available that identifies originating participant Mike and an entity associated with Mike. In this example, gateway system 439 processes Mike's participant identifier to determine if persona information is available by translating the participant identifier into a format recognized by persona system 435, and transfers the translated participant identifier to persona system 435 requesting a persona record that matches the translated participant identifier. In this case, persona system 435 determines that persona record 437 exists for Mike, such as by looking up the translated participant identifier in a relational database. Since persona record 437 is available, persona system 435 returns the persona record 437 to gateway system 439. Gateway system 439 then transfers the persona information for delivery to and display by communication device 411 registered as destination node 413 on P2P network 410. It should be understood that the persona information need not be routed through gateway system 439, but rather could be transferred via another path or network. For example, persona system 435 could transfer the persona information for delivery to communication device 411 in some examples. Regardless of the manner in which it is delivered, Sue ultimately receives the persona information from persona record 437 related to Mike's business persona.

In the meantime, a communication session is established between communication device 431 and communication device 411 over communication network 430 and P2P network 410. However, note that the session could be established either prior to, concurrent to, or subsequent to the transfer of the persona information from persona system 435 for delivery to communication device 411. After the session is established, user communications may be exchanged between communication devices 431 and 411 operated by Mike and Sue, respectively.

Referring to the block diagram of FIG. 5, the experience of Sue when operating communication device 411 is shown. As mentioned above, communication device 300 of FIG. 3 is representative of communication device 411. Thus, communication device 411 may comprise a user interface 305, which includes visual device 313, audio device 311, and peripheral device 309. During the session, visual device 313 displays call screen 317.

Call screen 317 displays a variety of information, such as a call menu having call history, dialing, contacts, and call options. Other options are available within the call menu, including hang up, mute, and transfer options. In this example, the call option is shown in bold to indicate that a call is underway. In this case, the call option displays that an incoming call is being received from Mike@MikesIT.com. The call status indicates that the call from Mike is still ringing and has not yet been answered by Sue. In addition, call screen 317 displays the persona information for Mike delivered for display to Sue. The persona information includes the communication handle, status, business name, and logo associated with Mike's business persona. In an additional example, a license number associated with Mike's business is displayed. It should be understood that some items included in the persona information could be omitted, while other types of persona information could be included.

Figure 6:
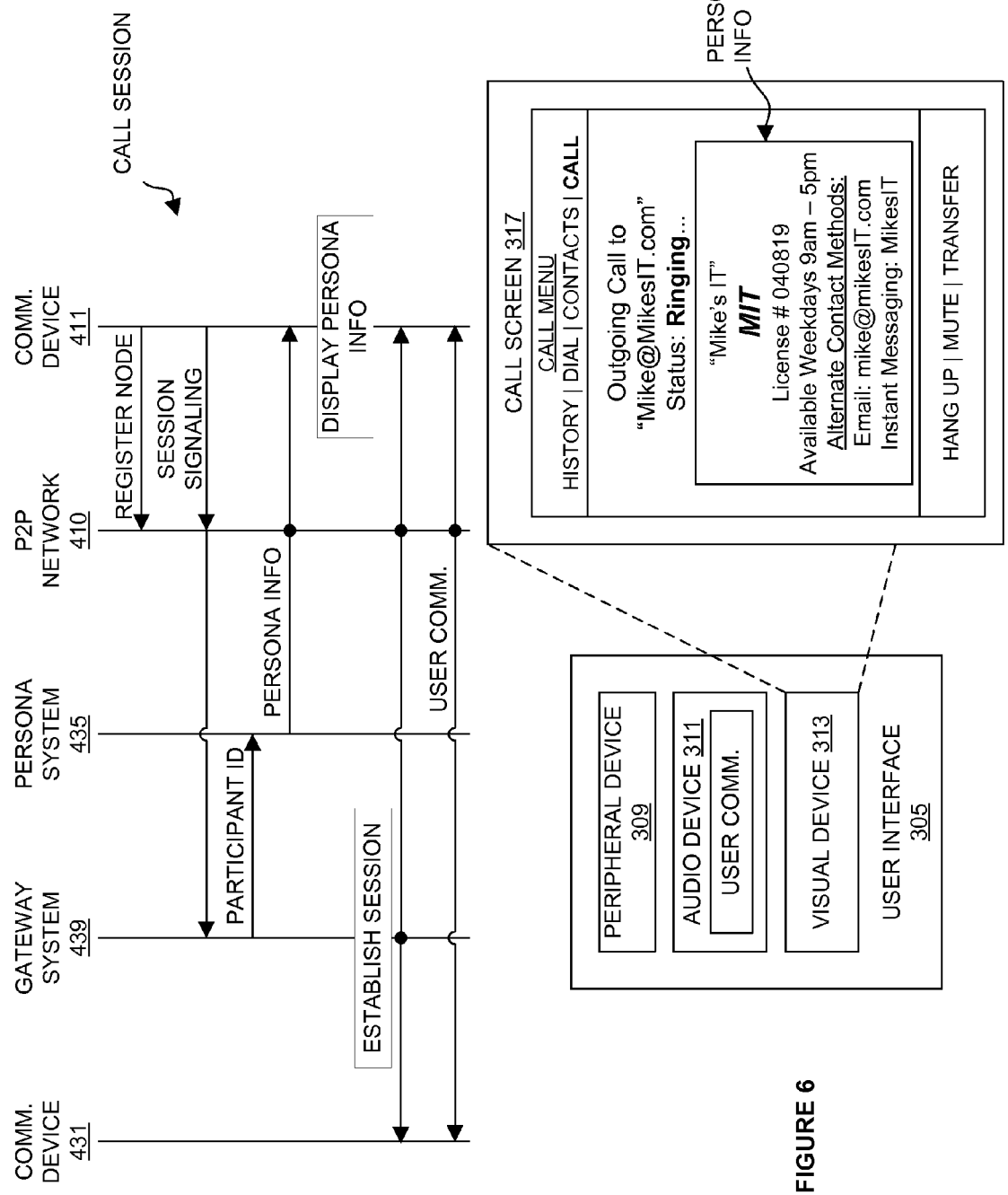
FIG. 6 illustrates a call flow diagram and a block diagram of a user interface and a call screen in an exemplary embodiment.

FIG. 6 illustrates an exemplary embodiment whereby Sue, a customer or potential customer of Mike, engages in a communication session with Mike. In this example, the communication session is a voice call initiated by Sue using communication device 411. In FIG. 6, two diagrams are shown: a session flow diagram and a block diagram. The session flow diagram illustrates the information flow of the session. The block diagram demonstrates a user experience.

Referring to the session flow diagram of FIG. 6, Sue operates communication device 411 to initiate a call to participant Mike. Prior to initiating the call to Mike, communication device 411 registers as a node 413 on P2P network 410. In this example, communication devices 421 and 431 operated by Mike comprise a twinned PSTN number for Mike. Thus, Sue may place the call to Mike using communication device 411 by dialing the twinned PSTN number to reach participant Mike on either communication device 421 or 431, depending on which is available. If device 421 is available, P2P network 410 would typically connect the call to node 423 since both devices 411 and 421 would be registered as nodes on the same P2P network 410. However, in this example, communication device 421 has not registered as a node 423 on P2P network 410, so P2P network 410 forwards the call request to communication network 430, which could comprise a public switched telephone network (PSTN), voice over internet protocol (VoIP) network, wireless communication network, a different type of P2P communication network from P2P network 410, or some other type of communication network.

Gateway system 439 receives session signaling when the call is transferred from P2P network 410 to communication network 430. The session signaling includes a participant identifier that is associated with a destination device 431, such as the twinned PSTN number dialed by Sue to contact Mike. Gateway system 439 processes the participant identifier to determine if persona information is available that identifies originating participant Mike and an entity associated with Mike. In this example, gateway system 439 processes the participant identifier to determine if persona information is available by translating the participant identifier into a format recognized by persona system 435, and transfers the translated participant identifier to persona system 435 requesting a persona record that matches the translated participant identifier. In this case, persona system 435 determines that persona record 437 exists for Mike, and returns the persona record 437 to gateway system 439.

In this example, a profile for Mike is stored on gateway system 439, which determines the specific persona information from persona record 437 that should be displayed on communication device 411. Also, the profile for Mike could determine the manner in which the persona information is displayed on communication device 411. For example, various rules that apply to particular users or groups of users could govern the manner in which the persona information is delivered to those users. To determine the identity of the caller, gateway system 439 could process the session signaling to determine a participant identifier associated with the origination device 411. In this example, gateway system 439 determines that the identity of the caller from communication device 411 is Sue.

Based on the profile for Mike, gateway system 435 determines that Sue is a member of a "business contacts" group of users, and thus gateway system 439 should transfer persona information for delivery to communication device 411 that complies with the rules in his profile for "business contacts". In this example, the persona information includes a calendar or schedule of Mike's availability and alternate contact methods for Mike. Mike has configured his profile to direct gateway system 439 to transfer his availability schedule and alternate contact methods for all users designated as "business contacts". Thus, gateway system 439 transfers the persona information including Mike's schedule and alternate contact information for delivery to and display by communication device 411 registered as destination node 413 on P2P network 410. In this manner, Sue receives the persona information for Mike, including his schedule and alternate contact information.

In the meantime, a communication session is established between communication device 431 and communication device 411 over communication network 430 and P2P network 410. However, note that the session could be established either prior to, concurrent to, or subsequent to the transfer of the persona information from persona system 435 for delivery to communication device 411. After the session is established, user communications may be exchanged between communication devices 431 and 411 operated by Mike and Sue, respectively.

Referring to the block diagram of FIG. 6, the experience of Sue when operating communication device 411 is shown. As mentioned above, communication device 300 of FIG. 3 is representative of communication device 411. Thus, communication device 411 may comprise a user interface 305, which includes visual device 313, audio device 311, and peripheral device 309. During the session, visual device 313 displays call screen 317.

Call screen 317 displays a variety of information, such as a call menu having call history, dialing, contacts, and call options. Other options are available within the call menu, including hang up, mute, and transfer options. In this example, the call option is shown in bold to indicate that it has been selected. When selected, the call option displays that an outgoing call to Mike@MikesIT.com has been placed. The call status indicates that the call is still ringing and has not yet been answered by Mike. In addition, call screen 317 displays the persona information for Mike delivered for display to Sue.

The persona information includes the communication handle, status, business name, and logo associated with Mike's business persona. A license number associated with Mike's business is also displayed. In addition, Mike's availability schedule is displayed, along with alternate contact methods for Mike. Sue may select Mike's email address or his instant messaging handle when displayed on call screen 317 in order to contact Mike by either of these alternate methods. In some examples, the persona information could include Mike's availability schedule for each of the different alternate contact methods displayed. It should be understood that some items included in the persona information could be omitted, while other types of persona information could be included.

Figure 7:
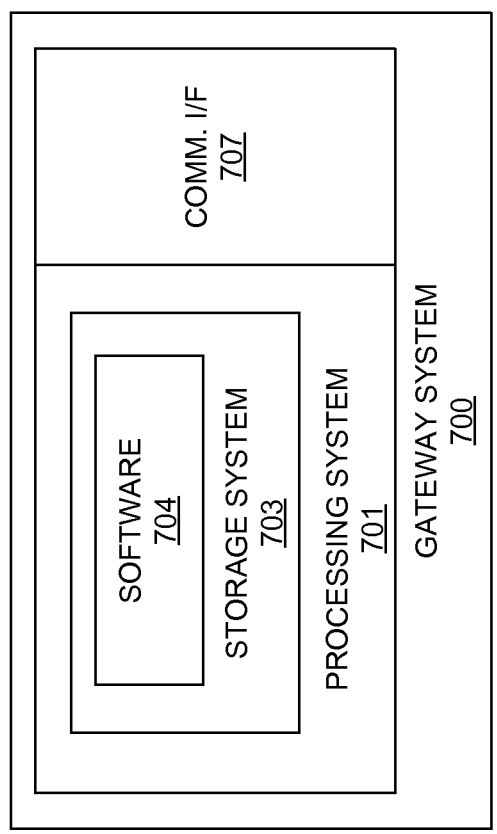
FIG. 7 illustrates a gateway system in an exemplary embodiment.

FIG. 7 illustrates gateway system 700 in embodiment. Gateway system 700 may be representative of gateway system 439, although system 439 could use alternative configurations. Gateway system 700 includes processing system 701, storage system 703, software 704, and communication interface 707. Processing system 701 is linked to storage system 703 and communication interface 707. Storage system 703 stores software 704, executable in operation by processing system 701.

Communication interface 707 comprises a network card, network interface, port, or interface circuitry that allows gateway system 700 to communicate with other communication devices over a variety of networks. Communication interface 707 may also include a memory device, software, processing circuitry, or some other device. Communication interface 707 may use various communication protocols, such as time division multiplex, internet, Ethernet, wireless, or some other communication format—including combinations thereof—to exchange communications as described herein for communication devices, such as persona information.

Processing system 701 may comprise a microprocessor and other circuitry that retrieves and executes software 704 from storage system 703. Storage system 703 comprises a disk drive, flash drive, data storage circuitry, or some other memory apparatus. Processing system 701 is typically mounted on a circuit board that may also hold storage system 703 and portions of communication interface 707.

Software 704 comprises computer programs, firmware, or some other form of machine-readable processing instructions. Software 704 may include an operating system, utilities, drivers, network interfaces, applications, virtual machines, or some other type of software. When executed by processing system 701, software 704 directs processing system 701 to operate gateway system 700 as described herein for gateway system 439.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to establish communication sessions between an origination network and a peer-to-peer network, the method comprising:
    receiving session signaling to establish a session between an origination device in the origination network and a destination node in the peer-to-peer network, wherein the session signaling includes a participant identifier associated with the origination device;
    processing the participant identifier to determine if persona information that identifies an originating participant and an entity associated with the originating participant is available for display by a destination device registered as the destination node on the peer-to-peer network and, if the persona information is available, transferring the persona information for delivery to and display by the destination device to a destination participant;
    establishing the session between the origination device and the destination device over the origination network and the peer-to-peer network; and
    exchanging user communications for the session between the origination device and the destination device,
    wherein establishing the session comprises establishing a first leg from the origination device to a gateway wherein the origination device is not registered as a node on the peer-to-peer network and wherein the gateway is registered as a node on the peer-to-peer network and a second leg from the gateway to the destination device.

2. The method of claim 1 wherein the participant identifier comprises a session initiation protocol (SIP) user identifier and wherein the peer-to-peer network comprises a peer-to-peer telephony service network.

3. The method of claim 1 wherein the participant identifier comprises a mobile station identifier, or caller identification information.

4. The method of claim 1 wherein the communication session comprises a voice call and wherein the user communications comprise voice communications.

5. The method of claim 1 wherein origination network comprises a public switched telephone network (PSTN) and wherein the peer-to-peer network comprises a peer-to-peer telephony service network.

6. The method of claim 1 wherein origination network comprises a voice over internet protocol (VoIP) network and wherein the peer-to-peer network comprises a peer-to-peer telephony service network.

7. The method of claim 1 wherein the persona information comprises a service handle that identifies the originating participant and a graphic that identifies the entity.

8. The method of claim 7 wherein the service handle has a format comprising participant_name@entity_name.suffix, wherein participant_name identifies the originating participant and wherein entity_name identifies the entity.

9. A communication system to establish communication sessions between an origination network and a peer-to-peer network, the system comprising:
    a gateway system configured to receive session signaling to establish a session between an origination device in the origination network and a destination node in the peer-to-peer network, wherein the session signaling includes a participant identifier associated with the origination device, process the participant identifier to determine if persona information that identifies an originating participant and an entity associated with the originating participant is available for display by a destination device registered as the destination node on the peer-to-peer network and, if the persona information is available, transfer the persona information for delivery to and display by the destination device to a destination participant, wherein the session is established between the origination device and the destination device over the origination network and the peer-to-peer network, and wherein user communications for the session are exchanged between the origination device and the destination device,
    wherein the gateway system further comprises a gateway and wherein the participant identifier comprises caller identification information and wherein establishing the session comprises establishing a first leg from the origination device to the gateway wherein the origination device is not registered as a node on the peer-to-peer network and wherein the gateway is registered as a node on the peer-to-peer network and a second leg from the gateway to the destination device.

10. The system of claim 9 wherein origination network comprises a public switched telephone network (PSTN).

11. A non-transitory computer readable medium having program instructions stored thereon that, when executed by a communication system, direct the communication system to:

receive session signaling to establish a session between an origination device in the origination network and a destination node in the peer-to-peer network, wherein the session signaling includes a participant identifier associated with the origination device;

process the participant identifier to determine if persona information that identifies an originating participant and an entity associated with the originating participant is available for display by a destination device registered as the destination node on the peer-to-peer network and, if the persona information is available, transfer the persona information for delivery to and display by the destination device to a destination participant;

establish the session between the origination device and the destination device over the origination network and the peer-to-peer network; and exchange user communications for the session between the origination device and the destination device, wherein establishing the session comprises establishing a first leg from the origination device to a gateway wherein the origination device is not registered as a node on the peer-to-peer network and wherein the gateway is registered as a node on the peer-to-peer network and a second leg from the gateway to the destination device.

12. The computer readable medium of claim 11 wherein the participant identifier comprises caller identification information.

13. The computer readable medium of claim 11 wherein the participant identifier comprises a session initiation protocol (SIP) user identifier.

14. The computer readable medium of claim 13 wherein the persona information comprises a service handle that identifies the originating participant and a graphic that identifies the entity.

15. The computer readable medium of claim 14 wherein the service handle has a format comprising participant_name@entity_name.suffix, wherein participant_name identifies the originating participant and wherein entity_name identifies the entity.

16. The computer readable medium of claim 11 wherein the participant identifier comprises a mobile station identifier.

17. The computer readable medium of claim 11 wherein the communication session comprises a voice call and wherein the user communications comprise voice communications.

18. The computer readable medium of claim 11 wherein origination network comprises a public switched telephone network (PSTN).

19. The computer readable medium of claim 11 wherein origination network comprises a voice over internet protocol (VoIP) network.

* * * * *